US012427074B2

(12) United States Patent
Su et al.

(10) Patent No.: US 12,427,074 B2
(45) Date of Patent: Sep. 30, 2025

(54) FEMORAL LIFT APPARATUS

(71) Applicant: UNITED ORTHOPEDIC CORPORATION, Hsinchu (TW)

(72) Inventors: Edwin P Su, Hsinchu (TW); Yan-Shen Lin, Hsinchu (TW); Jiann-Jong Liau, Hsinchu (TW); Yu-Liang Liu, Hsinchu (TW); Teh-Yang Lin, Hsinchu (TW); Wen-Chuan Chen, Hsinchu (TW)

(73) Assignee: UNITED ORTHOPEDIC CORPORATION, Hsinchu (TW)

( * ) Notice: Subject to any disclaimer, the term of this patent is extended or adjusted under 35 U.S.C. 154(b) by 462 days.

(21) Appl. No.: 17/952,420

(22) Filed: Sep. 26, 2022

(65) Prior Publication Data

US 2023/0404831 A1 Dec. 21, 2023

(30) Foreign Application Priority Data

Jun. 21, 2022 (TW) ................................ 111123112

(51) Int. Cl.
*A61G 13/12* (2006.01)
*A61G 13/00* (2006.01)

(52) U.S. Cl.
CPC ....... *A61G 13/123* (2013.01); *A61G 13/0081* (2016.11); *A61G 13/1295* (2013.01)

(58) Field of Classification Search
CPC ............ A61G 13/0063; A61G 13/1245; A61G 13/12; A61G 13/101
USPC ............................................................ 602/35
See application file for complete search history.

(56) References Cited

U.S. PATENT DOCUMENTS

| | | | | |
|---|---|---|---|---|
| 5,933,887 | A * | 8/1999 | Strange .................. | A61G 13/12 5/624 |
| 2006/0064103 | A1 | 3/2006 | Matta | |
| 2008/0228191 | A1* | 9/2008 | Downs ................. | A61B 17/025 606/100 |
| 2013/0191995 | A1* | 8/2013 | Bellows ............... | A61G 13/123 5/624 |
| 2015/0073420 | A1* | 3/2015 | Bookwalter ......... | A61B 17/025 606/90 |
| 2017/0231612 | A1* | 8/2017 | Termanini ............ | A61B 17/025 606/90 |
| 2017/0273846 | A1 | 9/2017 | Yancey et al. | |
| 2019/0262206 | A1* | 8/2019 | Yancey ................ | A61G 13/123 |

FOREIGN PATENT DOCUMENTS

TW 474174 U 1/2002

OTHER PUBLICATIONS

NPL Search (Year: 2025).*

* cited by examiner

*Primary Examiner* — Justin C Mikowski
*Assistant Examiner* — Amanda L Bailey
(74) *Attorney, Agent, or Firm* — Troutman Pepper Locke LLP; Tim Tingkang Xia, Esq.

(57) ABSTRACT

A femoral lift apparatus includes a lift device and a hook device. The hook device is coupled to the lift device. The femoral lift apparatus is labor-saving and can avoid the problem that the conventional femoral lift apparatus may block the surgical view, hinder the operation position for a hip joint replacement surgery. With the assistance of this current femoral lift apparatus, the hip joint replacement surgery can be performed more smoothly.

7 Claims, 7 Drawing Sheets

FEMORAL LIFT APPARATUS

REFERENCE TO RELATED APPLICATIONS

The present application is based on, and claims priority from, Taiwan application number 111123112 filed Jun. 21, 2022, the disclosure of which is hereby incorporated by reference herein in its entirety.

FIELD OF THE INVENTION

The invention relates to medical equipment for surgery, and more particularly, to a femoral lift apparatus for a hip joint replacement surgery.

BACKGROUND OF THE INVENTION

According to statistics, with the low birth rate for a long time, the aging society has become a general phenomenon in Taiwan. It is expected to be a super-aged society in 2026. In recent years, the number of patients requiring surgical treatment due to lesions or damage to the hip joint is increasing. The causes include avascular necrosis, post-traumatic conditions, rheumatoid arthritis, osteoarthritis, and so on. Among all of the global populations, the prevalence of avascular necrosis higher in Asian population. When avascular necrosis reaches to the second stage, hardening and cysts appears in the joint. The patient may have difficulty with activities because of the pain. Thus, it is necessary to consider conducting hip joint replacement surgery or proximal femoral osteotomy for the relieving pain and restore hip joint function.

A femoral hook is a surgical instrument for assisting a hip joint replacement surgery, so as to ensure that the exposure of proximal femur can be held in an appropriate position during the hip joint replacement surgery. Conventionally, after the femoral hook is placed beneath the proximal femur, the femoral hook is then pulled and held by an assisting person. It is quite laborious due to the need for manpower. In addition, because the assisting person who pulls the hook needs to stand next to the operating table, he/she may hinder or interfere with the surgical movement. In view of the aforementioned problems, an improved mechanical hanging structure is developed and used clinically. However, the mechanical hanging structure occupies the space above the operating table, which may obstruct the surgical view, operation position and hinder the physician from performing the operation.

SUMMARY OF THE INVENTION

The primary objective of the present invention is to provide a femoral lift apparatus, which avoids the problem that the manual operation of the conventional femoral lift apparatus is laborious and solves the problem that the conventional femoral lift apparatus may block the operation position during a hip joint replacement surgery, so that the hip joint replacement surgery can be performed more smoothly.

In order to achieve the aforementioned objective, the present invention provides a femoral lift apparatus, comprising a lift device and a hook device. The lift device includes a drive unit, a frame unit, a guide rod unit, a link unit, and a locking unit. The drive unit is a power unit including a telescopic rod and a mounting member. The telescopic rod is movable in a linear direction on a top of the drive unit. The mounting member is located on the drive unit and extends upward from the top of the drive unit by a height. The frame unit is connected to the mounting member so that the frame unit is fixed to one side of the drive unit. The frame unit includes a retaining member. The retaining member extends downward from the frame unit. The guide rod unit includes a positioning rod. A first end of the link unit is connected to the telescopic rod. A second end of the link unit is connected to a bottom end of the positioning rod. The locking unit is configured to be mounted to a slide rail disposed on a lateral side of an operating table. The locking unit includes a retaining portion to hold the retaining member. A bottom of the hook device is coupled to a top end of the positioning rod so that the hook device is fixed to a top end of the guide rod unit. The height is the height required for combining the mounting member with the frame unit.

Preferably, the frame unit further includes a guide rod groove. The guide rod unit further includes an accommodating rod. The bottom end of the positioning rod is connected to a top end of the accommodating rod. The accommodating rod is located in the guide rod groove. A junction of the accommodating rod and the positioning rod is connected to the second end of the link unit.

Preferably, the frame unit further includes a retaining frame and a main frame. A part of the retaining frame is fixed to the mounting member, and another part of the retaining frame is fixed to the main frame, so that the frame unit is fixed to the side of the drive unit. The main frame includes the guide rod groove and the retaining member. The guide rod groove is disposed in the main frame. An opening direction of the guide rod groove is the same as the linear direction. The retaining member extends downward from the main frame.

Preferably, the main frame is a T-shaped frame. The retaining frame is an L-shaped frame. One side of the retaining frame is connected to the mounting member, and another side of the retaining frame is connected to the main frame so that the frame unit is fixed to the side of the drive unit. The guide rod groove is disposed in the main frame. The retaining member extends downward from one side of the main frame.

Preferably, the link unit is an L-shaped arm. The first end of the link unit has a first link groove. The second end of the link unit has a second link groove. The first link groove is connected with the telescopic rod. The second link groove is connected with the bottom and the positioning rod.

Preferably, the hook device further includes a positioning unit and a hook unit. The positioning unit includes a positioning post and a perforated plate. A bottom end of the positioning post is connected to the top end of the guide rod unit. One end of the perforated plate is coupled to a top end of the positioning post. The perforated plate has a plurality of perforations.

Preferably, the perforated plate further has interconnecting holes between the perforations.

Preferably, the hook unit includes a vertical rod, an extension rod, and a hook. A bottom end of the vertical rod is connected to one of the perforations. One end of the extension rod is connected to a top end of the vertical rod. Another end of the extension rod is connected to one end of the hook. Another end of the hook is a hooked end.

DETAILED DESCRIPTION OF THE PREFERRED EMBODIMENTS

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein.

Figure 1:
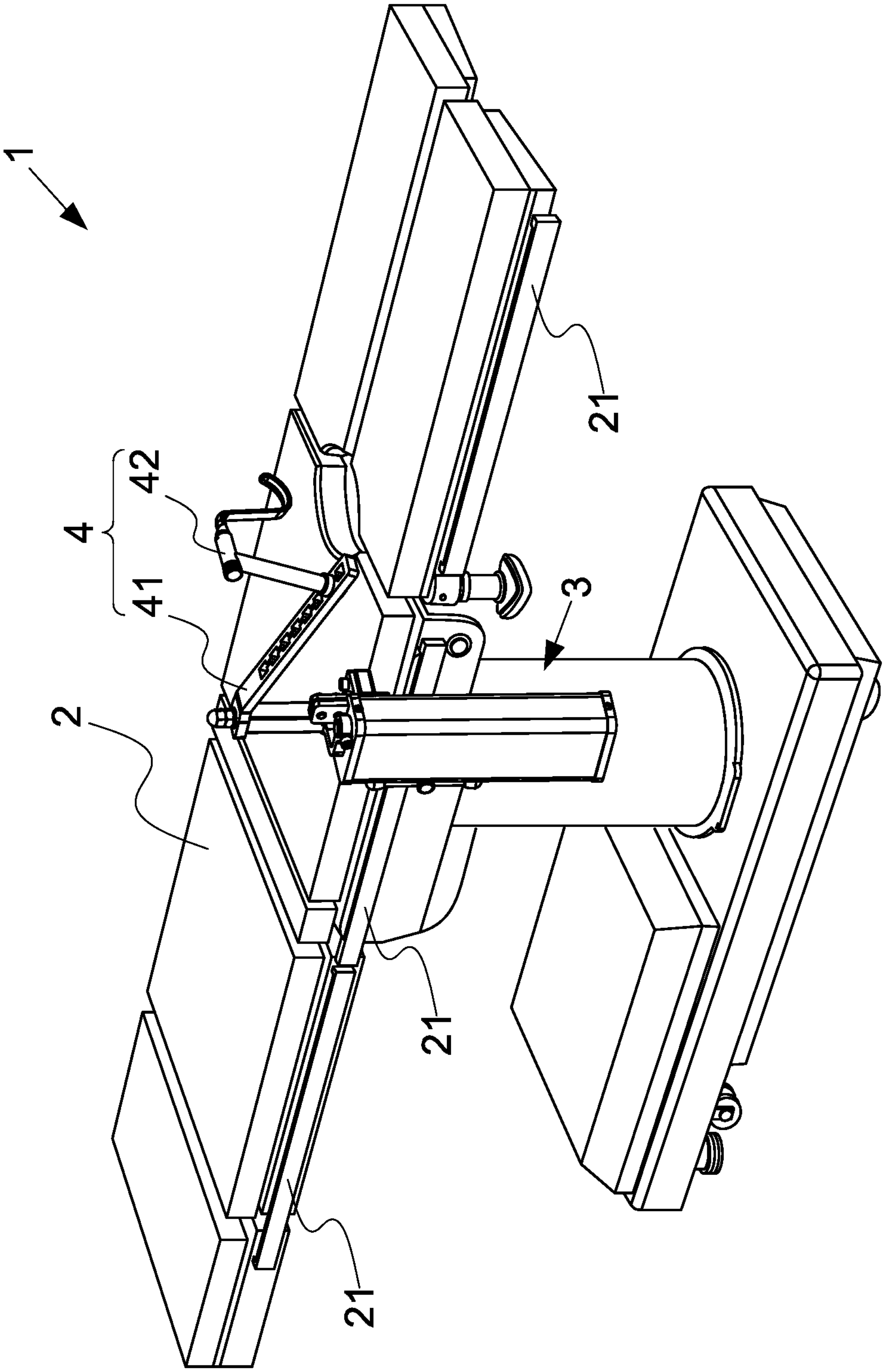
FIG. 1 is a schematic view of the femoral lift apparatus of the present invention installed on the lateral side of the operating table.

Please refer to FIG. 1. The present invention discloses a femoral lift apparatus 1. The femoral lift apparatus 1 is mounted to a slide rail 21 and is slidable along the slide rail 21. The femoral lift apparatus 21 can be positioned on the slide rail 21 when it is in the proper position required for an operation. Based on the foregoing, in one embodiment of the present invention, the slide rail 21 is directly disposed on the lateral side of an operating table 2, but not limited thereto. The slide rail 21 may be externally mounted on the lateral side of the operating table 2.

Figure 2:
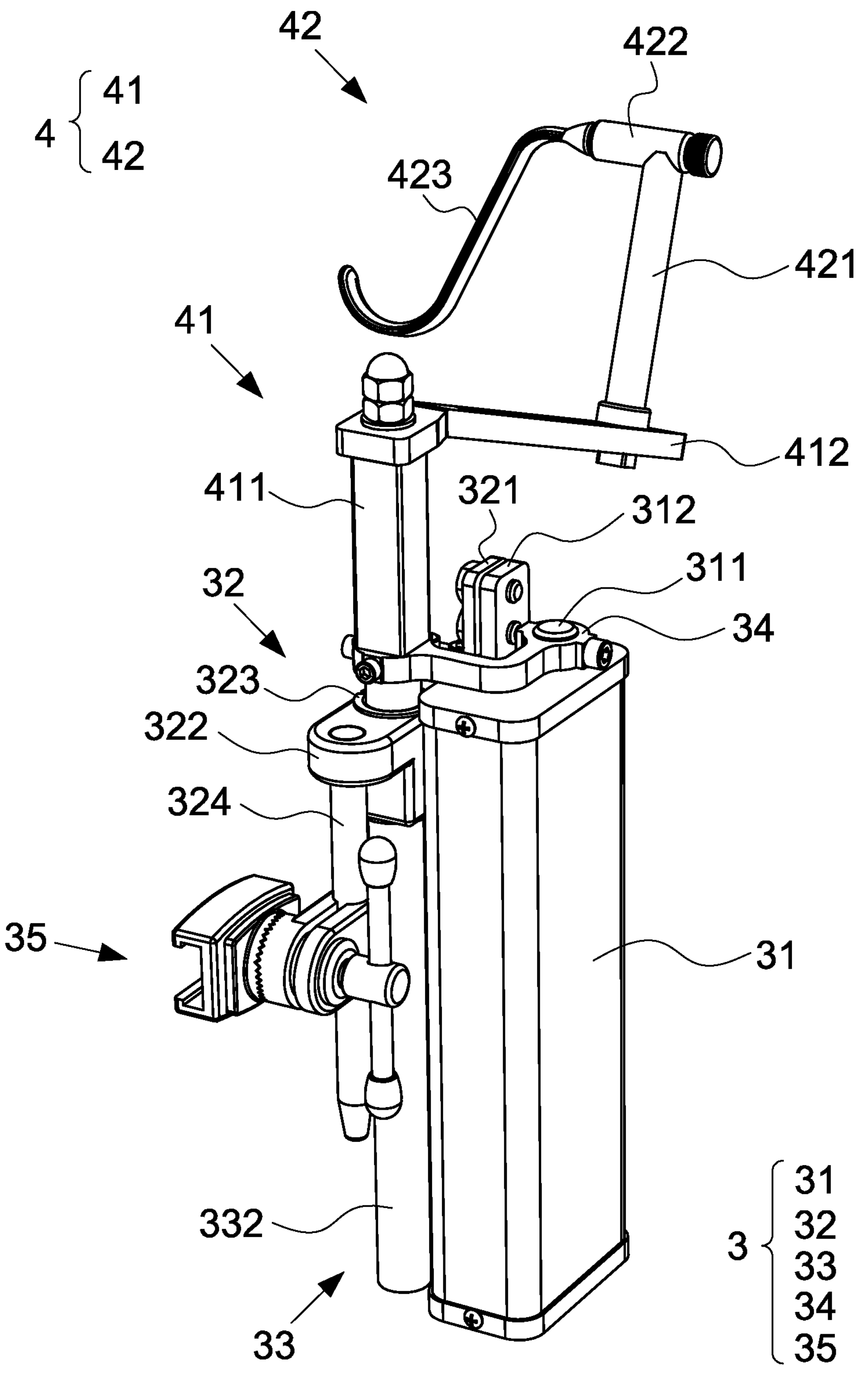
FIG. 2 is a perspective view of the femoral lift apparatus of the present invention.

Please refer to FIG. 1 and FIG. 2. The femoral lift apparatus 1 comprises a lift device 3 and a hook device 4. The hook device 4 is coupled to the lift device 3. The lift device 3 includes a drive unit 31, a frame unit 32, a guide rod unit 33, a link unit 34, and a locking unit 35. The hook device 4 includes a positioning unit 41 and a hook unit 42.

Figure 3:
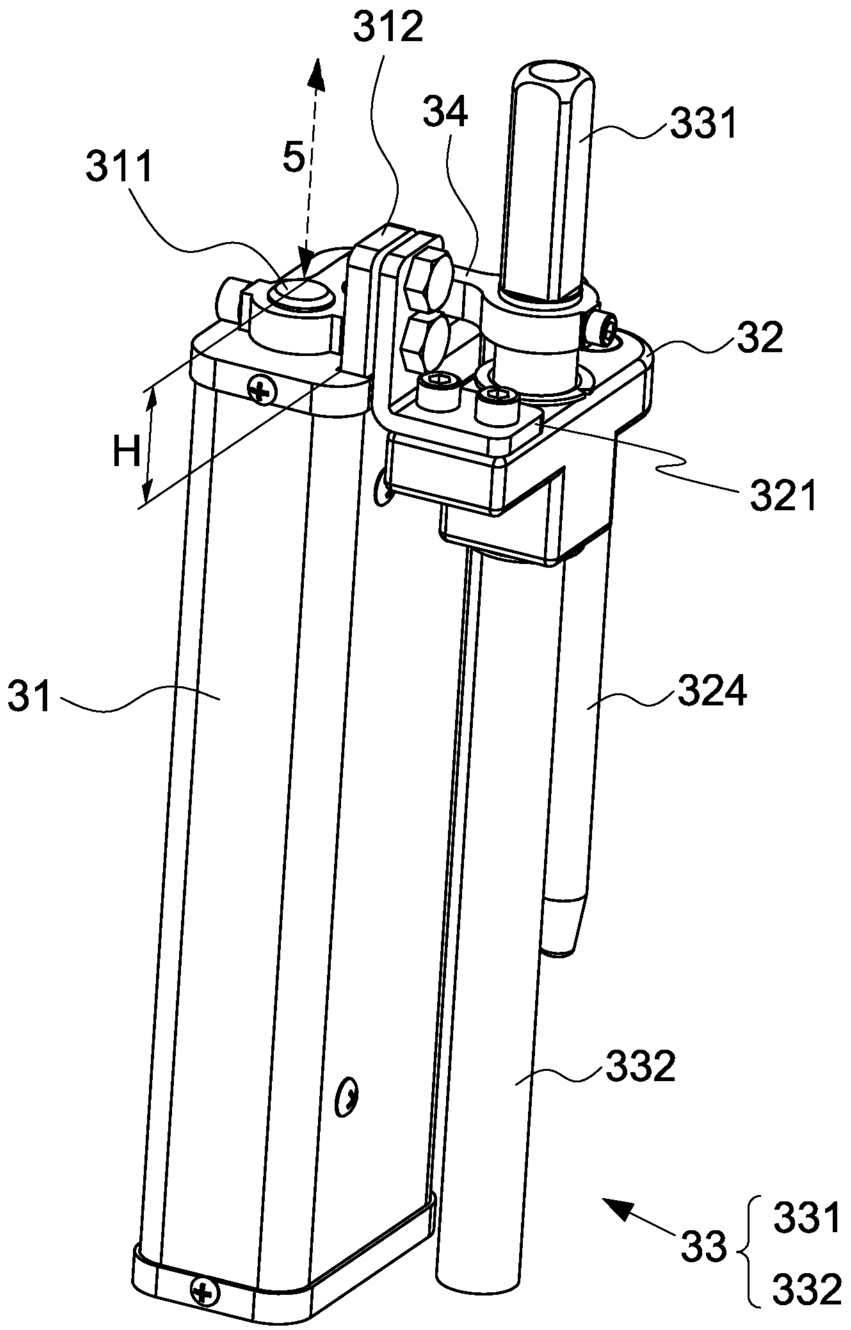
FIG. 3 is a perspective view of the lift device of the present invention, wherein the locking unit is not shown.
Figure 4:
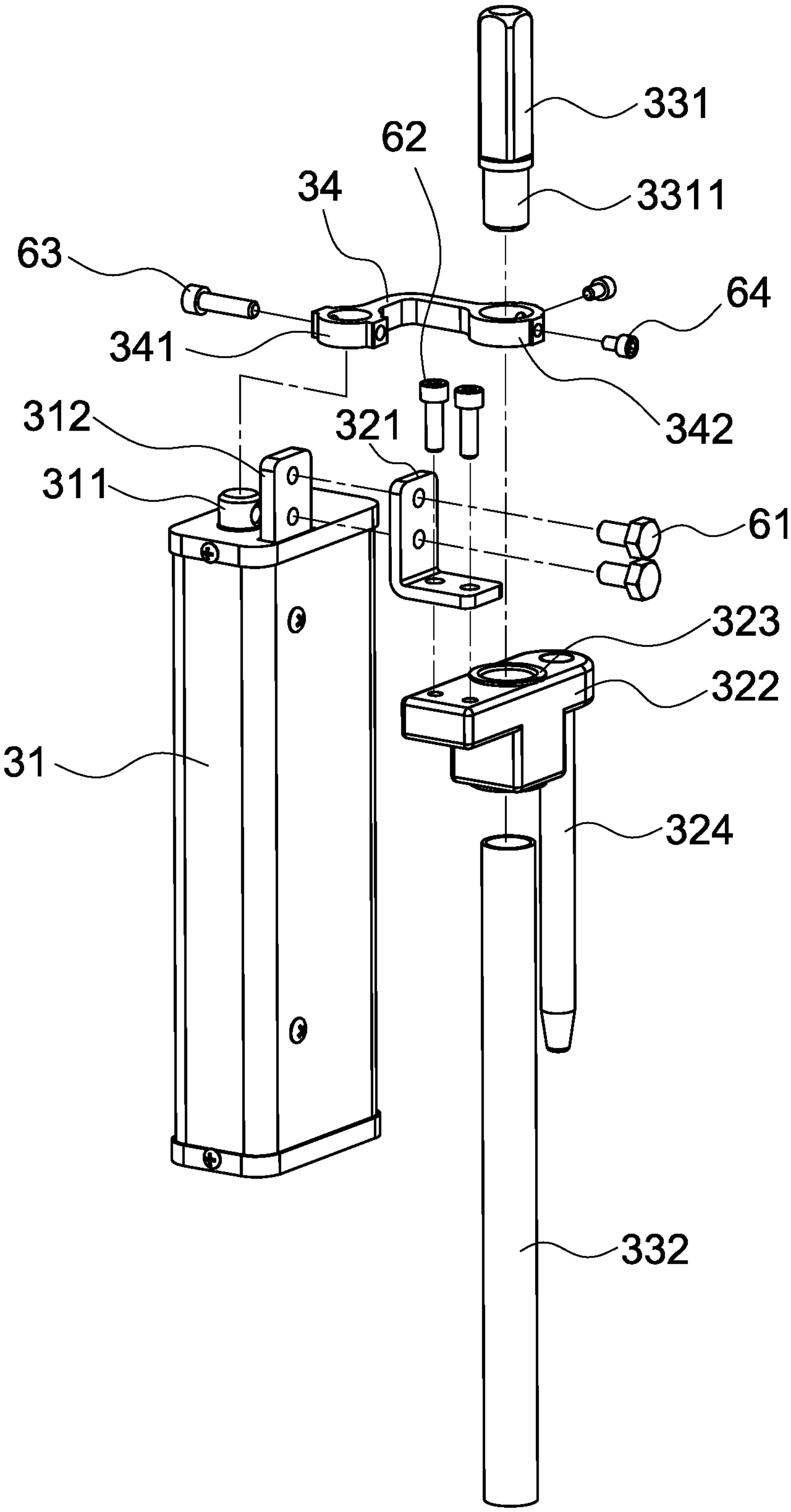
FIG. 4 is an exploded view of FIG. 3.

Please refer to FIG. 2, FIG. 3 and FIG. 4. The drive unit 31 is a power unit, including a telescopic rod 311 and a mounting member 312. The telescopic rod 311 is movable in a linear direction 5 on the top of the drive unit 31. The mounting member 312 is located on the top of the drive unit 31 and extends upward from the top of the drive unit 31 by a height H. The height H is the height required for combining the mounting member 312 with the frame unit 32. Based on the foregoing, in one embodiment of the present invention, the drive unit 31 is an electric push rod, which uses electric power to drive a DC motor for the telescopic rod 311 to move in the linear direction 5, but not limited thereto. The motor of the electric push rod may be an AC motor or a pulse motor. In another embodiment of the present invention, the drive unit 31 is an electric push rod and further includes a power supply and a foot pedal. The power supply is connected to the drive unit 31 through a power cord for supplying power to the drive unit 31. The foot pedal is connected to the drive unit 31 through by a transmission line, so as to control the telescopic rod 311 to move in the linear direction 5.

Please refer to FIG. 2, FIG. 3 and FIG. 4. The frame unit 32 includes a retaining frame 321 and a main frame 322. A part of the retaining frame 321 is fixed to the mounting member 312, and another part of the retaining frame 321 is fixed to the main frame 322, so that the frame unit 32 is fixed to one side of the drive unit 31. The frame unit 32 further includes a retaining member 324 extending downward from the main frame 322. Based on the foregoing, in one embodiment of the present invention, the main frame 322 includes a guide rod groove 323. The guide rod groove 323 is disposed in the main frame 322. The opening direction of the guide rod groove 323 is the same as the linear direction 5. The main frame 322 is a T-shaped frame. The guide rod groove 323 is disposed in the center of the main frame 322. The retaining member 324 extends downward from one side of the main frame 322. The retaining frame 321 is an L-shaped frame. One side of the retaining frame 321 is fixed to the mounting member 312 through a first fastener 61, and the other side of the retaining frame 321 is fixed to the main frame 322 through a second fastener 62. Both the first fastener 61 and the second fastener 62 are screws, but not limited thereto, the first fastener 61 and the second fastener 62 may be bolts, screws, rivets or welding layers.

Please refer to FIG. 2, FIG. 3 and FIG. 4. The guide rod unit 33 includes a positioning rod 331. The top end of the positioning rod 331 is coupled to the bottom of the hook device 4, that is, the hook device 4 is fixed to the top end of the guide rod unit 33. Based on the foregoing, in one embodiment of the present invention, the guide rod unit 33 further includes an accommodating rod 332. The bottom end of the positioning rod 331 is connected to the top end of the accommodating rod 332. The accommodating rod 332 is located in the guide rod groove 323. The bottom end of the positioning rod 331 has an insertion portion 3311. The accommodating rod 332 is a hollow rod. The insertion portion 3311 of the positioning rod 331 is insertedly accommodated in the accommodating rod 332. The accommodating rod 332 is configured to assist in guiding the positioning rod 331 to be moved in the linear direction 5. When the positioning rod 331 is moved in the linear direction 5, the accommodating rod 332 also bears the lateral bending force generated when the femur is lifted, so as to prevent the positioning rod 331 from being deformed by excessive lateral bending force. The accommodating rod 332 is a hollow rod, which can reduce the weight.

Please refer to FIG. 2, FIG. 3 and FIG. 4. A first end of the link unit 34 is connected to the telescopic rod 311, and a second end of the link unit 34 is connected to the junction of the accommodating rod 332 and the positioning rod 331. Based on the foregoing, in one embodiment of the present invention, the link unit 34 is an L-shaped arm. The first end of the link unit 34 has a first link groove 341, and the second end of the link unit 34 has a second link groove 342. The first link groove 341 is connected with the telescopic rod 311. The second link groove 342 is connected with the junction of the accommodating rod 332 and the positioning rod 331. The first link groove 341 is connected with the telescopic rod 311 through a third fastener 63. The second link groove 342 is connected with the junction of the accommodating rod 332 and the positioning rod 331 through a fourth fastener 64. Both the third fastener 63 and the fourth fastener 64 are screws, but not limited thereto, the third fastener 63 and the fourth fastener 64 may be bolts, screws, rivets or welding layers.

As shown in FIG. 2, FIG. 3 and FIG. 4, in another embodiment of the present invention, the guide rod unit 33 only includes the positioning rod 331, and the bottom end of the positioning rod 331 is connected to the second link groove 342 through the fourth fastener 64. Because the guide rod unit 33 does not include the accommodating rod 332, the main frame 322 of the frame unit 32 does not have the guide rod groove 323. This further reduces the overall weight.

Figure 5:
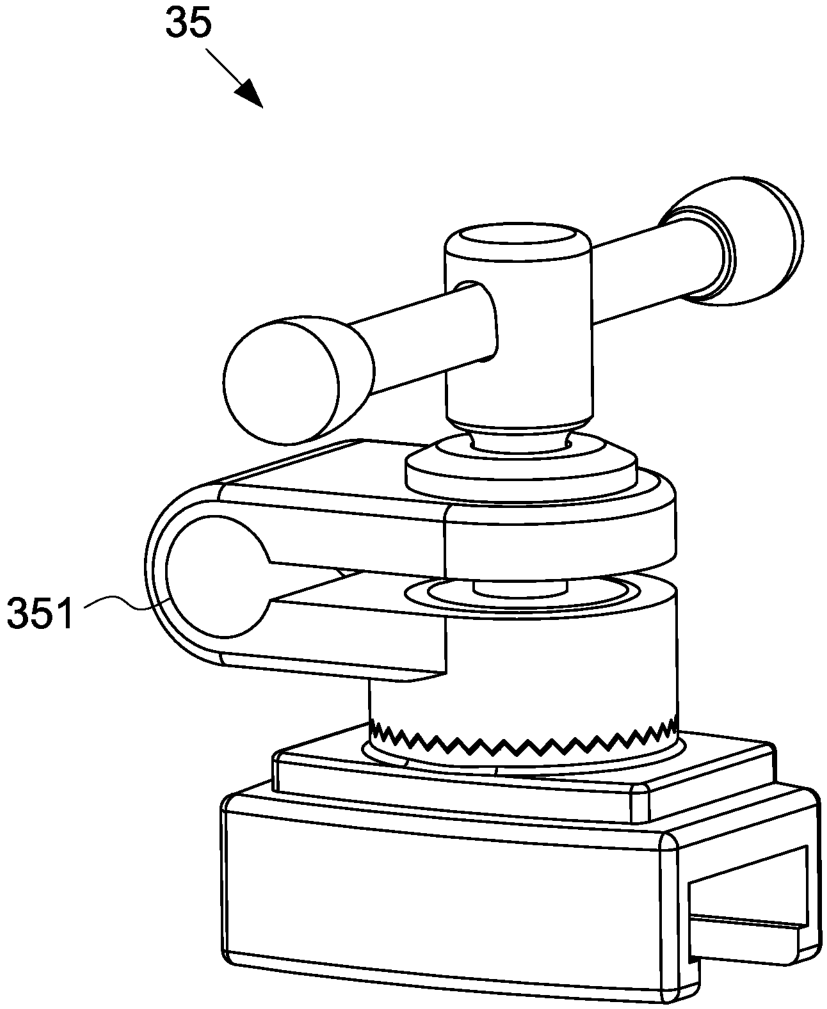
FIG. 5 is a perspective view of the locking unit of the present invention.

Please refer to FIG. 5. The locking unit 35 is configured to be mounted to the slide rail 21. The locking unit 35 includes a retaining portion 351 to hold the retaining member 324, so that the lift device 3 is able to slide on the slide rail 21 and can be positioned on the slide rail 21 after sliding to an appropriate position required for the operation. Based on the foregoing, in one embodiment of the present invention, the retaining member 324 is a rod, but not limited thereto. The retaining member 324 may be a cone, a block, or the like. The locking unit 35 is a "multi-directional fastener" as shown in Taiwan Patent No. 474174, filed on May 18, 2001. The retaining portion 351 corresponds to the "clamping hole 36" described in Taiwan Patent No. 474174 for holding the retaining member 324, so that the lift device 3 is able to slide on the slide rail 21 and can be positioned on the slide rail 21 after sliding to an appropriate position required for the operation, but not limited thereto. The locking unit 35 may be an operating table holder that can hold the retaining member 34.

Figure 6:
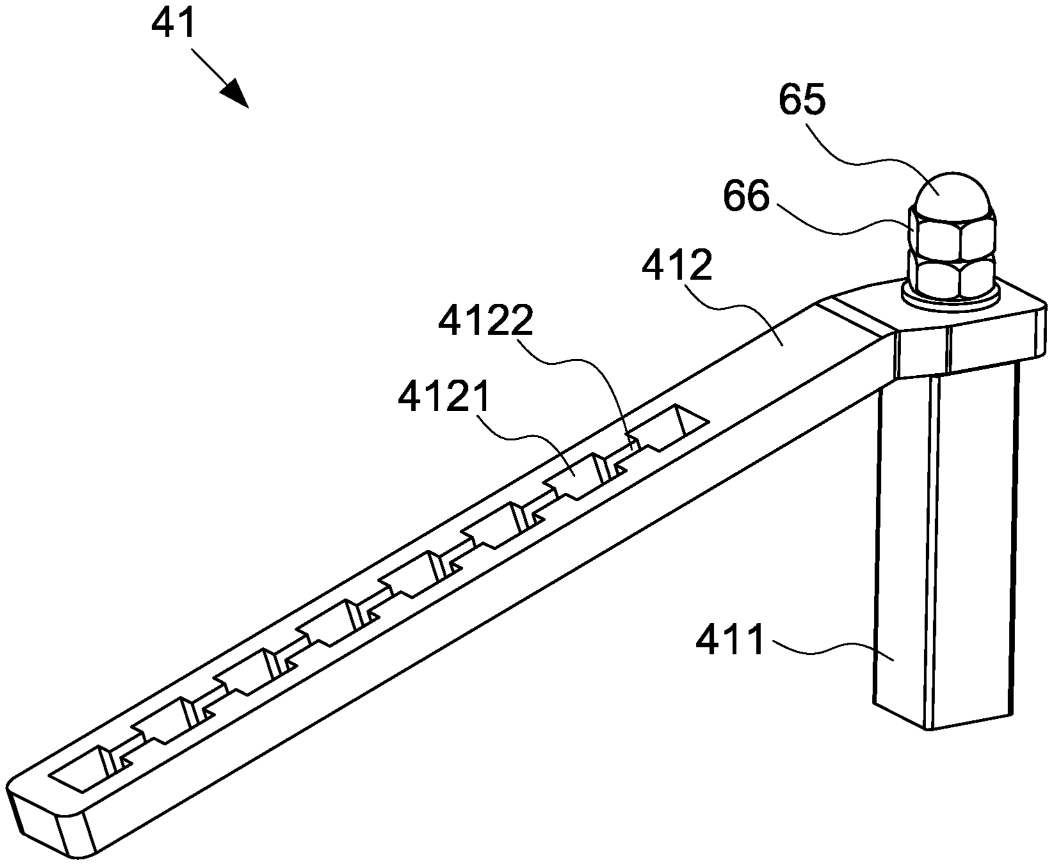
FIG. 6 is a perspective view of the positioning unit of the present invention.
Figure 7:
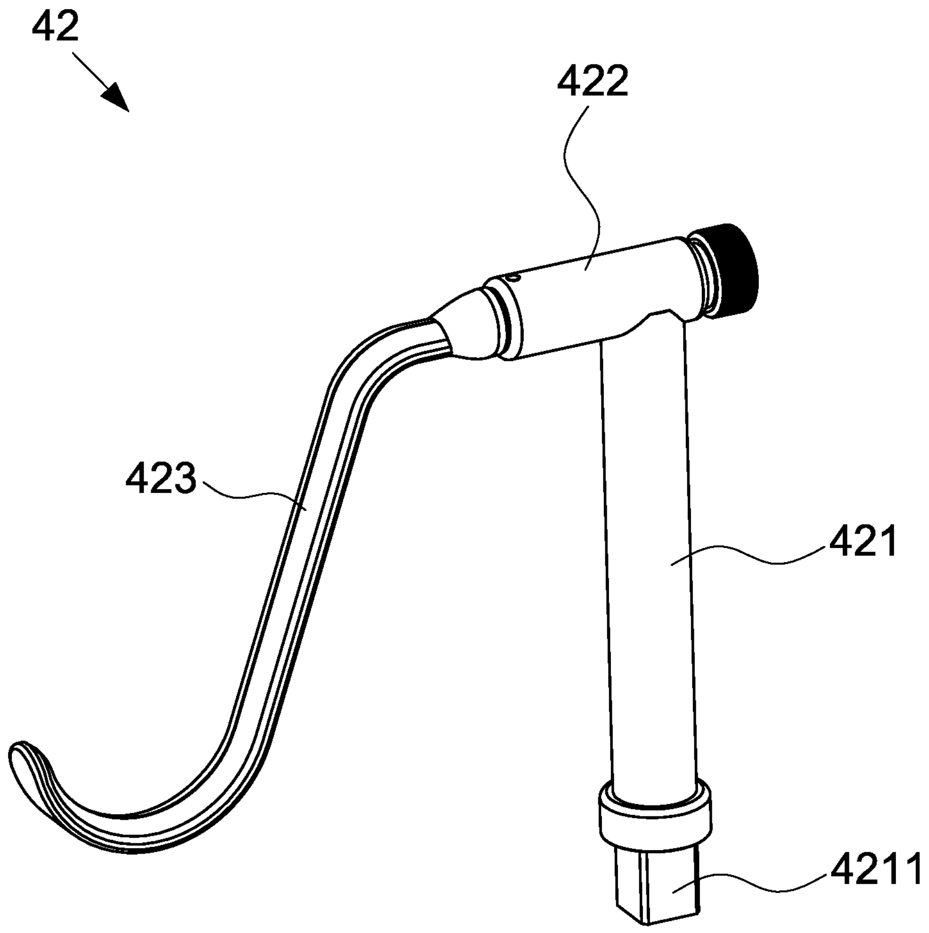
FIG. 7 is a perspective view of the hook unit of the present invention.

Please refer to FIG. 6 and FIG. 7. The hook device 4 includes the positioning unit 41 and the hook unit 42. The positioning unit 41 includes a positioning post 411 and a perforated plate 412. The top end of the positioning post 411 is coupled to one end of the perforated plate 412. The bottom end of the positioning post 411 is connected to the top end of the positioning rod 331, so that the positioning unit 41 is fixed to the top end of the guide rod unit 33. That is, the hook device 4 is fixed to the top end of the guide rod unit 33. The perforated plate 412 has a plurality of perforations 4121. The hook unit 42 includes a vertical rod 421, an extension rod 422, and a hook 423. The bottom end of the vertical rod 421 is connected to one of the perforations 4121 according to the need of the operation, so that the hook unit 42 is secured to the positioning unit 41. The top end of the vertical rod 421 is connected to one end of the extension rod 422. The other end of the extension rod 422 is connected to one end of the hook 423. The other end of the hook 423 is a hooked end. Based on the foregoing, in one embodiment of the present invention, the positioning post 411 is a hollow post, and the hook unit 42 is a femoral hook. The top end of the positioning post 411 is coupled to one end of the perforated plate 412 through a fifth fastener 65 and a sixth fastener 66. The perforated plate 412 has the plurality of perforations 4121 and a plurality of interconnecting holes 4122 between the perforations 4121, so that the perforations 4121 communicate with each other. The bottom end of the positioning post 411 is sleeved onto the top end of the positioning rod 331, so that the hook device 4 is secured to the top end of the guide rod unit 33. The fifth fastener 65 is a bolt, and the sixth fastener 66 is a nut. The top end of the vertical rod 421 is embedded in one end of the extension rod 422. The bottom end of the vertical rod 421 has a coupling portion 4211. The coupling portion 4211 can be inserted into one of the perforations 4121. One end of the hook 423 is embedded in the extension rod 422, and the other end of the hook 423 is a hooked end.

As shown in FIG. 1, FIG. 2 and FIG. 3, the lift device 3 is fixed to the slide rail 21 on the lateral side of the operating table 2 by the locking unit 35. When the telescopic rod 311 is moved in the linear direction 5, the link unit 34 is driven to move the guide rod unit 33 in the linear direction 5, and the positioning unit 41 is driven to move the hook unit 42 secured to the positioning unit 41 in the linear direction 5, so as to lift the femur to the appropriate height required for the operation. It is convenient for the operation to be performed smoothly.

Please refer to FIG. 1, FIG. 2 and FIG. 3. In one embodiment of the present invention, when using the femoral lift apparatus 1 provided by the present invention to perform a hip joint replacement surgery, the lift device 3 is first set on the slide rail 21. After the lift device 3 is slid to the proper position required for the operation, it is positioned on the slide rail 21 through the locking unit 35. Then, the positioning unit 41 is secured to the top end of the guide rod unit 33. After that, the hook unit 42 is used to hook the patient's femur, and the coupling portion 4211 of the hook unit 42 is inserted into an appropriate one of the perforations 4121 of the positioning unit 41, so that the hook unit 42 is supported by the positioning unit 41. Afterwards, the hook unit 42 can be moved in the linear direction by electronic control through the lift device 3. In this embodiment, the vertical height of the hook unit 42 is adjustable, so as to lift the femur to a suitable height required for the operation, so that the operation can be performed smoothly.

To sum up, the present invention provides a femoral lift apparatus, which is labor-saving and can overcome the problem that the conventional femoral lift apparatus may hinder the operation position for a hip joint replacement surgery, so that the operation can be performed smoothly.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A femoral lift apparatus, comprising:

a lift device, including:

a drive unit, the drive unit being a power unit including a telescopic rod and a mounting member, the telescopic rod being movable in a linear direction on a top of the drive unit, the mounting member being located on the drive unit and extending upward from the top of the drive unit by a height;

a frame unit, connected to the mounting member so that the frame unit is fixed to one side of the drive unit, the frame unit including a retaining member, the retaining member extending downward from the frame unit;

a guide rod unit, including a positioning rod;

a link unit, a first end of the link unit being connected to the telescopic rod, a second end of the link unit being connected to a bottom end of the positioning rod; and a locking unit, configured to be mounted to a slide rail disposed on a lateral side of an operating table, the locking unit including a retaining portion to hold the retaining member;

a hook device, a bottom of the hook device being coupled to a top end of the positioning rod so that the hook device is fixed to a top end of the guide rod unit;

wherein the height is the height required for joining the mounting member with the frame unit, and the link unit is an L-shaped arm, the first end of the link unit has a first link groove, and the second end of the link unit has a second link groove, the first link groove is connected with the telescopic rod, and the second link groove is connected with the bottom end of the positioning rod.

2. The femoral lift apparatus as claimed in claim 1, wherein the frame unit further includes a guide rod groove; the guide rod unit further includes an accommodating rod; the bottom end of the positioning rod is connected to a top end of the accommodating rod, the accommodating rod is located in the guide rod groove, and a junction of the accommodating rod and the positioning rod is connected to the second end of the link unit.

3. The femoral lift apparatus as claimed in claim 2, wherein the frame unit further includes a retaining frame and a main frame; a part of the retaining frame is fixed to the mounting member, another part of the retaining frame is fixed to the main frame, so that the frame unit is fixed to the side of the drive unit, the main frame includes the guide rod groove and the retaining member, the guide rod groove is disposed in the main frame, an opening direction of the guide rod groove is the same as the linear direction, and the retaining member extends downward from the main frame.

4. The femoral lift apparatus as claimed in claim 3, wherein the main frame is a T-shaped frame, the retaining frame is an L-shaped frame, one side of the retaining frame is connected to the mounting member, another side of the retaining frame is connected to the main frame so that the frame unit is fixed to the side of the drive unit, the guide rod groove is disposed in the main frame, and the retaining member extends downward from one side of the main frame.

5. The femoral lift apparatus as claimed in claim 1, wherein the hook device further includes a positioning unit, the positioning unit includes a positioning post and a perforated plate, a bottom end of the positioning post is connected to the top end of the guide rod unit, one end of the perforated plate is coupled to a top end of the positioning post, and the perforated plate has a plurality of perforations.

6. The femoral lift apparatus as claimed in claim 5, wherein the perforated plate further has interconnecting holes between the perforations.

7. The femoral lift apparatus as claimed in claim 1, wherein the hook device further includes a hook unit, the hook unit includes a vertical rod, an extension rod and a hook, a bottom end of the vertical rod is connected to one of the perforations, one end of the extension rod is connected to a top end of the vertical rod, another end of the extension rod is connected to one end of the hook, and another end of the hook is a hooked end.

* * * * *